United States Patent [19]

Drako et al.

[11] Patent Number: 5,404,447
[45] Date of Patent: Apr. 4, 1995

[54] APPARATUS FOR MANIPULATING IMAGE PIXEL STREAMS TO GENERATE AN OUTPUT IMAGE PIXEL STREAM IN RESPONSE TO A SELECTED MODE

[75] Inventors: Dean M. Drako, Los Altos; Hsiu-Tung A. Yu, Palo Alto, both of Calif.

[73] Assignee: Apple Computer, Inc., Cupertino, Calif.

[21] Appl. No.: 180,192

[22] Filed: Jan. 11, 1994

Related U.S. Application Data

[63] Continuation of Ser. No. 815,817, Dec. 30, 1991, abandoned.

[51] Int. Cl.⁶ .............................................. G06F 15/40
[52] U.S. Cl. ................... 395/162; 364/920.7; 364/927.3; 364/927.5; 364/DIG. 2
[58] Field of Search ............... 358/433, 445, 448, 426, 358/450, 451, 456, 466, 447, 449, 455, 457; 382/50, 56, 41, 46; 345/199, 150, 193, 213, 138, 98; 395/116, 117, 132, 162, 164, 165, 166, 149, 155

[56] References Cited

U.S. PATENT DOCUMENTS

| | | | |
|---|---|---|---|
| 4,683,466 | 7/1987 | Holtey et al. | 364/927.67 |
| 4,700,181 | 10/1987 | Maine et al. | 340/747 |
| 4,707,738 | 11/1987 | Ferre et al. | 358/135 |
| 4,724,431 | 2/1988 | Holtey et al. | 340/703 |
| 4,878,178 | 10/1989 | Takakura et al. | 340/703 |
| 4,918,526 | 4/1990 | Lewis et al. | 358/160 |
| 4,975,861 | 12/1990 | Fujimoto | 340/703 |
| 5,075,675 | 12/1991 | Barker et al. | 364/286.3 |
| 5,184,124 | 2/1993 | Molpus et al. | 358/261.4 |
| 5,196,834 | 3/1993 | Edelson et al. | 340/703 |
| 5,231,385 | 7/1993 | Gengler et al. | 340/703 |
| 5,250,933 | 10/1993 | Beaudin et al. | 345/115 |
| 5,278,640 | 1/1994 | Aizu et al. | 358/527 |
| 5,285,271 | 2/1994 | Gennetten | 358/527 |

FOREIGN PATENT DOCUMENTS

| | | |
|---|---|---|
| 0206352 | 6/1986 | European Pat. Off. . |
| 2194705 | 3/1988 | United Kingdom . |
| WO8704033 | 7/1987 | WIPO . |
| WO8704034 | 7/1987 | WIPO . |

*Primary Examiner*—Thomas C. Lee
*Assistant Examiner*—Moustafa Mohamed Meky
*Attorney, Agent, or Firm*—Blakely, Sokoloff, Taylor & Zafman

[57] ABSTRACT

In circuitry which transfers data in streams in which a plurality of individual discrete groups of data are all addressed to the same address, apparatus for manipulating the data appearing in streams including a manipulation engine responsive to some portion of each group of the data transferred to cause the data to be manipulated in a particular manner.

20 Claims, 5 Drawing Sheets

| MODE | STREAM #1 | STREAM #2 | OUTPUT |
|---|---|---|---|
| Transparent | a1R1G1B1 | a2R2G2B2 | R=R1+ (1 - a1)R2<br>G=G1+ (1 - a1)G2<br>B=B1+ (1 - a1)B2<br>a=a1+ (1 - a1)a2 |
| Coverage | If a1 +a2 <= 0,<br>a1R1G1B1 | a2R2G2B2 | R=R1 + R2<br>G=G1 + G2<br>B=B1 + B2<br>a=a1 + a2 |
|  | If a1 + a2 > 1,<br>a1R1G1B1 | a2R2G2B2 | R=R1 + (1-a1)R2<br>G=G1 + (1-a1)G2<br>B=B1 + (1-a1)B2<br>a=1 |
| Weatherman<br>(Keyfit) | If R1G1B1 > threshold<br>a1R1G1B1 | a2R2G2B2 | a=1<br>RGB=R2G2B2 |
| Alpha Override | If a2 = 0, |  | a=0 |
| Premultiply<br>Only | a1R1G1B1 |  | R=a1R1<br>G=a1G1<br>B=a1B1<br>a=a1 |
| Premultiply<br>& Transparent | a1R1G1B1 | a2R2G2B2 | R=a1R1+(1-a1)R2<br>G=a1G1+(1-a1)G2<br>B=a1B1+(1-a1)B2<br>a=a1+(1-a1)a2 |
|  | If a1 + a2 <= 1, |  | R=a1R1+a2R2 |
| Premultiply<br>Coverage | a1R1G1B1 | a2R2G2B2 | a=a1 + a2 |
|  | But if a1 +a2 > 1,<br>a1R1G1B1 | a2R2G2B2 | R=a1R1+(1-a1)R2<br>G=a1G1+(1-a1)G2<br>B=a1B1+(1-a1)B2<br>A=1 |

FIGURE 2

| Park | Trek | Cpybm | Rev | Emot | Result Alpha | Asel 1 | Port 1 | Asel 2 | Port 2 | Asel 3 | Port 3 |
|---|---|---|---|---|---|---|---|---|---|---|---|
| 1 | - | - | - | - | a1 | 1 | a1 | 1 | 0 | 0 | a2 |
| 0 | 1 | - | - | - | 0 | 0 | 0 | 1 | 0 | 0 | a2 |
| 0 | 0 | 1 | - | - | a2 | 0 | 0 | 2 | 1 | 0 | a2 |
| 0 | 0 | 0 | 1 | - | a1+(~a1)*a2 | 1 | a1 | 0 | ~a1 | 0 | a2 |
| 0 | 0 | 0 | 1 | 1 | a1+(~a1)*a2 | 1 | a1 | 2 | ~a1 | 0 | a2 |
| 0 | 0 | 0 | 1 | 0 | a1+a2 | 1 | a1 | 2 | 1 | 0 | a2 |
| 0 | 0 | 0 | 0 | 1 | 1 | 0 | 0 | 2 | 1 | 1 | 1 |

| Park | Trek | Cpybm | Rev | Emot | Result Red | Rsel0 | Port0 | Rsel2 | Port2 | Asel3 | Port3 |
|---|---|---|---|---|---|---|---|---|---|---|---|
| 1 | - | - | - | - | a1*R1 | 1 | a1 | 2 | 0 | 0 | R2 |
| 0 | 1 | - | - | - | R1 | 0 | 1 | 2 | 0 | 0 | R2 |
| 0 | 0 | 1 | 0 | - | R2 | 2 | 0 | 1 | 1 | 1 | R2 |
| 0 | 0 | 0 | 1 | - | R1+(~a1)*R2 | 0 | 1 | 1 | 1 | ~a1 | R2 |
| 0 | 0 | 0 | 1 | 1 | a1R1+(~a1)*R2 | 1 | a1 | 0 | ~a1 | a2 | R2 |
| 0 | 0 | 0 | 0 | 1 | a1R1+a2R2 | 1 | a1 | 3 | a2 | ~a1 | R2 |
| 0 | 0 | 0 | 1 | 1 | a1R1+(~a1)*R2 | 1 | 1 | 0 | 1 | 1 | R2 |
| 0 | 0 | 0 | 1 | 0 | R1+R2 | 0 | 1 | 1 | 1 | ~a1 | R2 |
| 0 | 0 | 0 | 0 | 1 | R1+(~a1)*R2 | 0 | 1 | 0 | ~a1 | ~a1 | R2 |

FIGURE 6

APPARATUS FOR MANIPULATING IMAGE PIXEL STREAMS TO GENERATE AN OUTPUT IMAGE PIXEL STREAM IN RESPONSE TO A SELECTED MODE

This is a continuation of application Ser. No. 07/815,817, filed Dec. 30, 1991, now abandoned.

BACKGROUND OF THE INVENTION

1. Field of the Invention

This invention relates to the processing of data and, more particularly, to methods and apparatus for combining or otherwise manipulating a plurality of streams of data.

2. History of the Prior Art

The typical computer system sends each word of data to a particular address unique to that word. The word (or less) of data may be combined with another word or otherwise manipulated depending on the instruction for the particular operation.

The necessity of dealing with the addressing and manipulation of each word requires a good deal of the time involved in computer operations. In order to increase the speed of operation of computers, arrangements have been devised which transfer large numbers of words together in blocks. These arrangements allow a computer system to address all of the large number of words as a stream of data to be sent to an address at a destination. At the destination, the information is typically transferred to sequential addresses. These arrangements speed the operations of computers by which data is transferred.

However, even though the transfer of the data in blocks or streams has been substantially accelerated, if the data is to be manipulated in some manner such as by combining it with data from other streams of data, that operation still has to be accomplished on a word by word basis once the data arrives at its destination. The simple transfer of the data in streams would be substantially enhanced for many purposes were there an ability to combine in various ways a plurality of streams of data to produce single streams where in stream form. In this way, the individual operations required to manipulate words of data and combine those with other words of data could be bypassed in many instances.

For example, where a first stream of data describes a particular picture which is to be displayed on the output of a display device, and a second stream of data describes a second picture which is to be displayed on the output of the same display device at the same time, it would be very useful if the pixel data in the two streams could be combined in a single operation while still in the two streams rather than in single word manipulations at the destination. Combining data while in streams would help accelerate various computer operations and be useful where operations need to be accomplished in real time. Combining data while in streams would allow the manipulation of data to occur rapidly enough to handle real time operations.

SUMMARY OF THE INVENTION

It is, therefore, an object of the present invention to provide apparatus for combining streams of data.

It is another, more specific object of the present invention, to provide apparatus for combining streams of data in a plurality of different ways.

These and other objects of the present invention are realized in circuitry which transfers data in streams in which a plurality of individual discrete groups of data are all addressed to the same address, where the circuitry includes apparatus for manipulating the data appearing in streams comprising a manipulation engine responsive to some portion of each group of the data transferred to cause the data to be manipulated in a particular manner such as by multiplying the data by a value or combining it with the data in another stream of data.

These and other objects and features of the invention will be better understood by reference to the detailed description which follows taken together with the drawings in which like elements are referred to by like designations throughout the several views.

BRIEF DESCRIPTION OF THE DRAWINGS

FIG. 2 is a table illustrating a plurality of different desirable combinations of data accomplished by the present invention.

FIG. 6 is a truth table useful in understanding the operation of the invention.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION OF THE INVENTION

Figure 1:
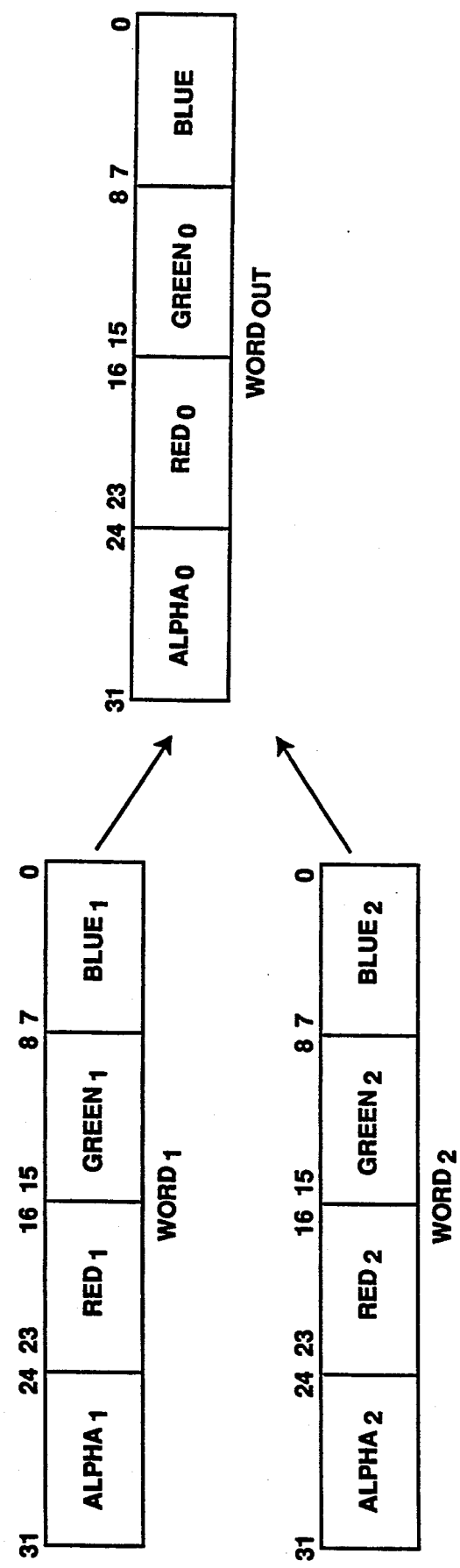
FIG. 1 is a diagram illustrating the bits of a word of data defining a pixel to be displayed at the output of a particular computer system.

Referring now to FIG. 1, there are shown three words of binary data. The particular words illustrated include data defining a particular pixel to be presented on an output display of a computer system capable of displaying twenty-four bit color output. The words illustrated each include thirty-two bits of binary data divided into four bytes. Three of these bytes store information related to a particular one of the three (red, green, and blue) shades of color which when combined define the color of the particular pixel. The other byte of data stores a quantity referred to as "alpha" which in various ways may define an operation to be performed with regard to the pixel. Since a byte provides eight bits of binary information, 256 individual binary numbers may be stored as alpha values. Typically, if all of the bits are ones, the alpha value is referred to as a "one," while if all of the bits are zeroes, the alpha value is referred to as "zero."

There are various operations which it is often desirable to accomplish on the data which is to be presented on an output display before the data is presented. It would be very useful if these manipulations could be accomplished on streams of data rather than on individual data words. For example, when two pictures are to be displayed on a computer output display so that one picture is on top of the other, the data describing the two pictures ($word_1$ and $word_2$) may appear in two individual streams. The amount by which the background picture ($word_2$) shows through the foreground picture ($word_1$) may be controlled by a binary alpha value which varies between decimal zero and 256 to describe the transparency of the foreground picture. In the preferred embodiment and typically in dealing with twenty-four bit color application programs, if the alpha value of each of the foreground pixels is all ones (a "one"), the foreground picture is entirely opaque and the background cannot be seen through it. On the other hand, if the alpha value of the foreground is some value between all zeroes (a "zero") and all ones (a "one"), then some amount of the background picture shows through the foreground picture. It is desirable to combine the two streams of data which define two pictures using the alpha values in a manner to cause a single stream of data (wordout) to result which provide the desired picture of pixels to be displayed.

Another operation of which certain computers are capable is termed anti-aliasing. Essentially, it has been found that straight edges formed of pixels running diagonally on an output display may be made to appear less jagged if the pixels defining the outer edge of the straight edge are rendered at varying lower levels of intensity. This may be accomplished for any single picture stream by providing the pixel intensity value as the alpha value for each pixel. When two pictures utilizing this technique for intensity determination are overlaid on an output display, it is necessary to combine the two values for the pixels in the two streams used to determine how each edge pixel is to be displayed. In accomplishing this operation, the alpha values of the two pixels are used to determine the final intensity values of each of the resulting pixels.

Another desirable way in which two pictures may be combined is exemplified by the television news broadcast of the weather. Often, when presenting television, it is desirable to present one picture such as a weatherman over a background such as a satellite view of the weather without the background showing through at all. This must often be accomplished with rapidly moving pictures as in the television weather picture case. This is typically called a weatherman mode of operation. Since modern computers are being used to present television pictures, the ability to combine pixels in this manner is desirable; and it is especially desirable that the combination be accomplished in real time. This may be accomplished using a picture of the weatherman in front of a solid colored background. When the background color is recognized, the background picture is substituted for it. In this manner, the weatherman will appear superimposed on the weather map background. When in the weatherman mode, the alpha value of foreground pixels is monitored so that when the solid color for which the background pixel is to be substituted is found, it may be overwritten by the background.

In modern multitasking computer systems, a number of different application programs are often displayed simultaneously in different windows on an output display. The pixels for the different windows are often presented in separate streams. In order to accomplish the presentation of the different pictures within the different windows, the pictures are often clipped so that only data falling within the boundaries of the windows is displayed. A method of combining two streams of data has been developed in accordance with the present invention by which alpha values may be used to determine when a picture is to be clipped in this manner. For example, by providing an alpha value for a background pixel with a value of zero, the output at the data pixel position may be clipped.

Another useful operation which may be accomplished on streams of data is to apply some particular values to all of the pixels of one picture to be displayed so that each pixel is associated with a value. These values might be the same or different for the different pixels. A mode which would allow the multiplication of each color shade byte in a single stream of pixels would be very desirable. This may be accomplished by using the alpha value of a pixel as a multiplier.

Of course, this and other of the aforementioned operations may be combined to more rapidly accomplish the various combinations of stream data. The different possible operations which have just been discussed are listed in the table of FIG. 2. In this table, each of the operations is designated by name and the mathematical operation performed in order to obtain the desired result is given.

As may be seen, in a transparency mode each shade value of the foreground is added to the shade value of the background multiplied by one minus the alpha value of the foreground. In this manner, the alpha value of the foreground directly controls how much of the background shows through for each of the shades of color in the final pixel. The same operation takes place with respect to the alphas values of the pixels. Thus, the final alpha value is the initial foreground alpha value plus the quantity one minus the foreground alpha value multiplied by the background alpha value.

In a coverage mode which may be used for clipping of images, if the sum of the foreground and background alpha values is equal to one or less, the two shade values for each shade are added together and the two alpha values are added together to determine the shade and the saturation of the final pixel. Thus, the final color is determined by adding the shade values together (i.e., red plus red, green plus green, blue plus blue); and the intensity of the pixel is the combined intensity of the two pixels. This also allows the anti-aliasing control to be achieved where two pictures overlap one another.

If in the coverage mode the total of the alpha values is greater than one signifying that the intensity level would be brighter than maximum, then the alpha value for the foreground pixel is used to control the shade values so that they are combined in the same manner as are the values in the transparency mode. The alpha value of each combined output pixel, however, is assigned a maximum value (one).

In a weatherman mode, if the color values are greater than some threshold value, then the alpha of the foreground pixel is assigned the value of one. By choosing a particular usually solid color as a threshold value, when that color is detected in the foreground a different background pixel may be substituted so that the background shows through at any position where that foreground color exists.

In an alpha override mode, if the alpha value of the background is a zero, then the alpha value of the combined pixel is a zero so that no pixel is presented and clipping occurs.

In a premultiply mode, the value of each shade in one stream is multiplied by the alpha value. This operation may be extended so that the premultiply operation occurs before some other operation by which streams of data are manipulated. For example, the coverage mode may be used with the premultiply mode. This combining multiplies each shade value of the foreground stream by its alpha value if the alphas values of the two pixels sum to less than one. Where the alphas are greater than one in total, the combining produces the same result as the transparency mode alone.

Figure 3:
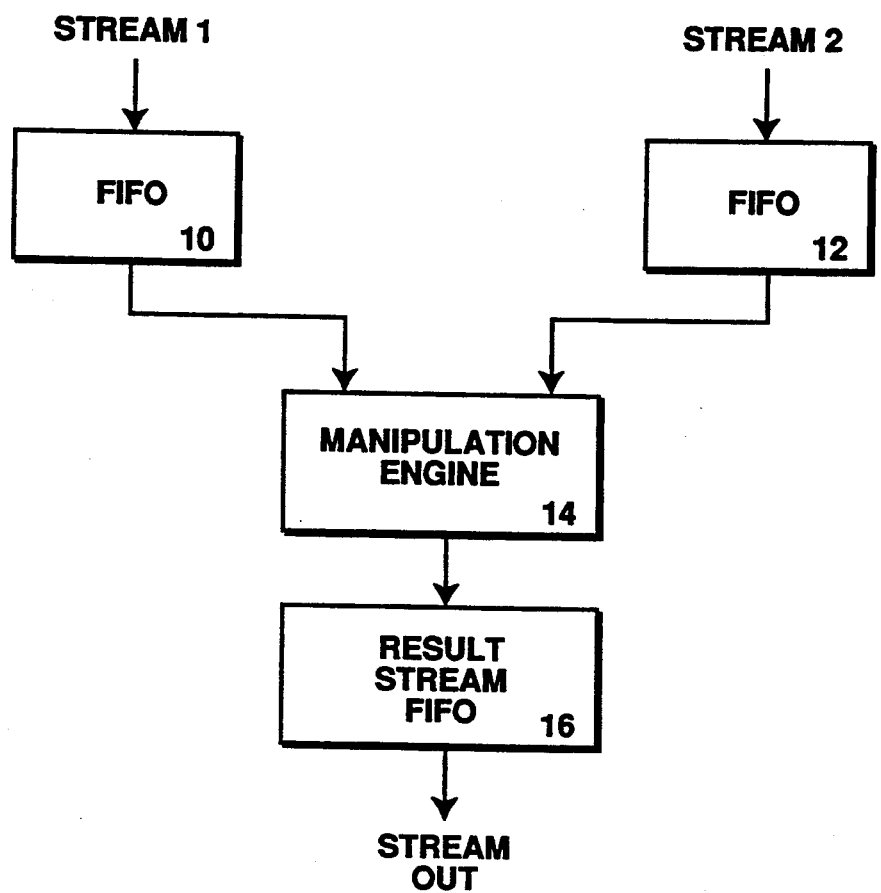
FIG. 3 is a block diagram illustrating a general outline of an arrangement in accordance with the present invention.

FIG. 3 describes in block diagram form an arrangement for accomplishing the various manipulations of the data of the two streams of information in accordance with the present invention. In FIG. 3, a first stream of data is addressed to and appears at a stream 1 input terminal to a first-in first-out circuit (FIFO) 10. A second stream of data is addressed to and appears at a stream 2 input terminal to a FIFO 12. Each of the FIFOs 10 and 12 has a sufficient number of memory elements to store the data elements (such as words) of the particular stream in the sequence in which they appear.

The two streams of information are in the form described above in which the entire stream of data is addressed to the address of the first element of data and the remaining elements appear in sequence following one another. The individual elements of data are to be combined or otherwise manipulated while in the form of streams in one of the ways described above. As the individual elements of data appear they are stored in the two FIFOs 10 and 12 so that individual elements of each are available for use simultaneously. In this manner, one element of data from stream 1 and one elements of data from stream 2 may be manipulated together in the manner that the operation indicates.

One element of data (e.g., a red/green/blue pixel value) from each stream may then be manipulated by a manipulation engine 14 to accomplish the particular desired operation. Once the operation has been accomplished, the combined data element is transferred to a third FIFO 16 which stores the combined data elements in the sequential order in which the data elements of the original streams appeared. Like the FIFOs 10 and 12, the FIFO 16 has a sufficient number of memory elements to store the data elements of the combined stream in the sequence in which they appear. From the FIFO 16, the new stream may be transferred for further use within the computer system.

Figure 5:
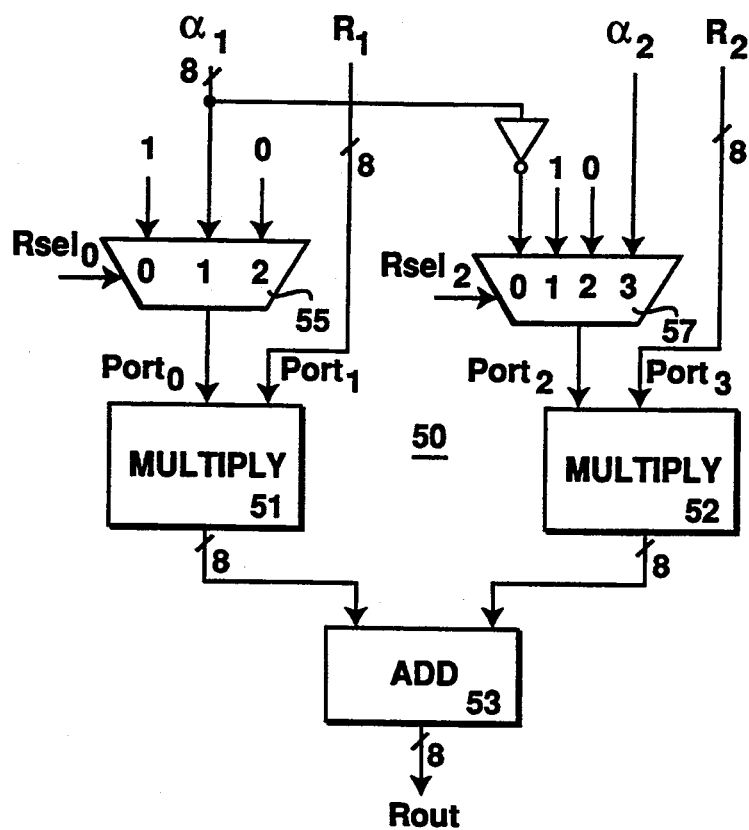
FIG. 5 is a block diagram illustrating another circuit used in carrying out the invention.
Figure 4:
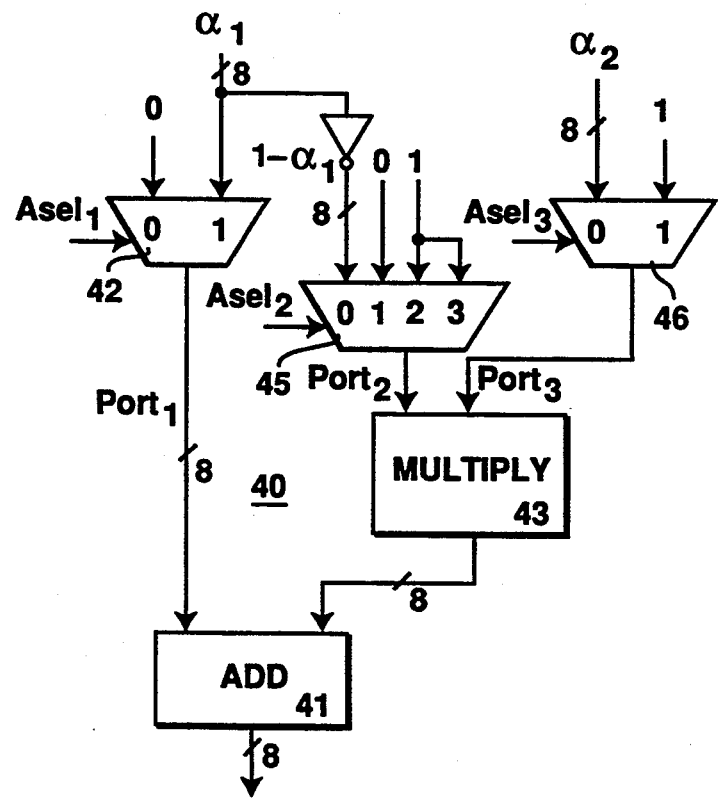
FIG. 4 is a block diagram illustrating a first circuit used in carrying out the invention.

FIGS. 4 and 5 are block diagrams of circuits which may be utilized in a manipulation engine 14 such as that shown in FIG. 3 for providing the results defined in FIG. 2. FIG. 6 is a truth table describing the various signals applied to the circuits of FIGS. 4 and 5 in order to obtain those results.

FIG. 4 illustrates a circuit 40 which provides the desired results for combining the alpha portions of color pixels. FIG. 5 illustrates a circuit 50 which provides the desired results for combining any one of the three red, green, or blue portions of color pixels. The circuitry illustrated in FIG. 5 would therefore be reproduced for each of the three shades of color in a manipulation engine 14 such as that of FIG. 3.

Referring to FIG. 4, the circuit 40 is shown to include an adder circuit 41. The adder circuit 41 receives input signals from a multiplexor 42 and a multiplier circuit 43. The multiplexor circuit 42 receives as input signals the alpha value of the first stream $a_1$ and a value of zero; one or the other of these signals may be chosen by a signal $Asel_1$. The multiplier circuit 43 receives as input the output signals from a pair of multiplexors 45 and 46. The multiplexor circuit 45 receives as input signals the inverted alpha value of the first stream $a_1$ (equivalent to "one" minus the alpha value), a value of zero, and a value of one on two different terminals. One of these signals may be chosen by a selection signal $Asel_2$. The multiplexor circuit 46 receives as input signals the alpha value of the second stream $a_2$ and a value of one; one of these signals may be chosen by a selection signal $Asel_3$. As is illustrated in FIG. 4, in a preferred embodiment, each of the input signals furnished is provided as an eight bit binary value used in twenty-four bit color pixel presentations. The outputs furnished by each of the circuits are also eight bit values (derived from the eight most significant bits of the result of a multiplication). Also illustrated in FIG. 4 are three port designated ports 1–3 at the output terminals of the three multiplexors 42, 45, and 46.

Referring to FIG. 5, a circuit 50 is shown which includes a first multiplier circuit 51 and a second multiplier circuit 52. Each of the multiplier circuits 51 and 52 receives a pair of input values and furnishes a single output value to an adder circuit 53. The adder circuit 53 provides the output value for the shade manipulating portion of the manipulating engine 14 of the invention.

The multiplier circuit 51 receives the shade value of the first stream (in the figure, the red value is used for illustration so that value is $R_1$) while the multiplier circuit 52 receives the shade value of the second stream $R_2$. The multiplier circuit 51 also receives the output furnished by a multiplexor circuit 55. The multiplexor circuit 55 receives as input signals the alpha value of the first stream $a_1$, a value of zero, and a value of one; one or the other of these signals may be chosen by a signal $Rsel_1$. The multiplier circuit 52 also receives the output furnished by a multiplexor circuit 57. The multiplexor circuit 57 receives as input the inverted alpha value of the first stream $a_1$ (i e., "one" minus alpha), the alpha value of the second stream $a_2$, a value of zero, and a value of one. One of these signals may be chosen by a signal $Rsel_2$ depending upon the particular mode of operation selected. As is illustrated in FIG. 5, in a preferred embodiment each of the input signals furnished is provided as an eight bit binary value used in twenty-four bit color pixel presentations. The outputs furnished by each of the circuits 51–53 are also eight bit values (derived from the eight most significant bits of the result of a multiplication). Also illustrated in FIG. 5 are four port designations ports 0–3 at the inputs to the two multiplier circuits 51 and 52.

FIG. 6 is a truth table illustrating the signals applied to the circuits 40 and 50 of FIG. 4 and 5 in order to cause the manipulation engine to produce the desired output values. As may be seen in FIG. 6, a number of terms are defined. An operation named PREMO signifies a premultiply operation only for stream one. The term AO indicates an alpha override mode used for clipping a pixel when the alpha value of stream two is zero. The term KEYFIT indicates the weatherman mode in which the color of the foreground which is to be replaced is present so that a background pixel is presented in its place.

The mode identified as TCB is used in a transparency form when two pictures are to be displayed simultaneously on a computer output display so that one is on top of the other to control the amount by which the background picture shows through. This TCB mode is also used in a second coverage form to provide for the controlling the intensity of pixel values in order to reduce the effect of jagged edges when two pictures are overlaid on an output display.

The PREM mode is a mode in which one of the streams is premultiplied and then the two streams of data are combined in the transparency form of the TCB mode described above.

Finally, the ALSAT mode is a toggle used in the coverage form of the TCB mode when the total of the alpha values from the two streams is greater than one.

Below the mode indications in FIG. 6 are shown a series of zeroes, ones, and dashes. If a one appears in a column, then the particular mode is selected. If a zero appears, usually the mode is not selected. However, in TCB mode, the coverage form is selected by a zero and the transparency form of the mode by a one. If a dash appears in a column, it has no effect on the results.

Thus, a one is found in the leftmost column in FIG. 6 if the PREMO mode is selected to premultiply one of the streams of data without any other manipulation of data. This produces the signals running in the row to the right of the one. For the alpha-manipulating circuit 40 of FIG. 4, the $a_1$ value appearing at the multiplexor 42 is transferred by the multiplexor 42 in response to an $Asel_1$ signal of one. The multiplexor 45 transfers a value of zero in response to an $Asel_2$ signal of one. The multiplexor 46 transfers the value of $a_2$ since the $Asel_3$ signal is zero. Thus a zero is added to the $a_1$ value to produce the $a_1$ value as output; this is the expected value for this operation as may be seen from the table of FIG. 2.

Simultaneously, the shade-manipulating circuit 50 responds to the PREMO mode signal by applying an $Rsel_1$ value of one to the multiplexor 55 to transfer a value of $a_1$ to port zero. This is multiplied by the value $R_1$ by the multiplier circuit 51 to produce an output equal to $a_1R_1$. At the same time an $Rsel_2$ signal of two causes the multiplexor 57 to select a value of zero. The value of zero is multiplied by the value of $R_2$ at the multiplier circuit 52. Consequently the adder 53 adds zero to $a_1R_1$ to produce an output value of $a_1R_1$, the desired output. Thus, when it is desired to simply multiply the value of one stream by its alpha value, the PREMO mode accomplishes this in the manner illustrated.

Similarly, in the AO mode which is used among other things for clipping, a zero value is applied as the $Asel_1$ signal to the multiplexor 42, a zero is applied as the $Asel_3$ signal to the multiplexor 46, and a one is applied as the $Asel_2$ selection signal to the multiplexor 45 of the circuit 40 when a clip is desired. This causes a zero value to be transferred by the multiplexor 42, a zero to be transferred by the multiplexor 45, and $a_2$ to be transferred by the multiplexor 46. The value of $a_2$ is then multiplied by zero at the multiplier circuit 43 and added to the zero from the multiplexor 42 at the adder 41. This produces the desired zero value for the alpha of the resulting pixel and results in the background pixel being clipped.

Simultaneously, the circuit 50 receives an $Rsel_1$ value of zero and an $Rsel_2$ value of two. The $Rsel_2$ value of two selects a zero at the multiplexor 57 which is multiplied by the $R_2$ value by the multiplier 52 to produce a zero at the input to the adder 53. The $Rsel_1$ value of zero causes a one to be generated by the multiplexor 55 and multiplied by the $R_1$ value at the multiplier circuit 51. This is added by the adder 53 to the zero to produce an output of $R_1$, the desired value. This value is then placed at the position of the pixel and provides for the clipping of the $R_2$ shade value. The green and blue shades would be similarly clipped by identical circuitry.

The other modes function in the same manner to produce the desired output. However, it should be noted that certain of the modes may be operating simultaneously. For example, in the transparency form of the TCB mode, the PREM mode may be on or off so that in addition to providing output for a transparency operation, stream one may be multiplied by an alpha value before it is otherwise manipulated with the data in stream two. Thus, the shade values produced in the transparency half of the TCB mode where there is no premultiplication are $R_1+(\sim a_1 * R_2)$. On the other hand, with premultiplication, the output is $(a_1 * R_1)+(\sim a_1 * R_2)$ where $\sim a_1 = 1 - 1a_1$.

Similarly, the ALSAT mode operates together with the coverage form of the TCB mode to produce different results where there is saturation (the alpha values total more than one) or there is not saturation.

Reviewing the possible modes of operation for the circuit 50, the modes are as follows beginning at the row at the top of the truth table: premultiply only, AO, Keyfit (Weatherman), transparency form of TCB without premultiply, transparency form of TCB with premultiply, coverage form of TCB unsaturated with premultiply, coverage form of TCB saturated with premultiply, coverage form of TCB unsaturated without premultiply, and coverage form of TCB saturated without premultiply. A check through each of the possible modes will illustrate that results in accordance with the table of FIG. 2 are produced by the circuitry of FIG. 4 and 5.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A logic circuit for manipulating image pixel streams to produce an output image pixel stream, said image pixel streams composed of individual pixels having an alpha value and a plurality of discrete color values, said individual pixels of an image pixel stream having a common address, said logic circuit comprising:

receiving means for receiving a first image pixel stream representative of a first display image and a second image pixel stream representative of a second display image;

mode means for selecting a particular mode for combining said first and second image pixel streams; and manipulation means for generating said output image pixel stream in response to said particular mode selected by said mode means, said manipulation means comprising means for combining said first and second image pixel streams to generate an output color value according to a first procedure or to generate an output color value according to a second procedure depending on a relationship between a first alpha value of said first image pixel stream and a second alpha value of said second image pixel stream said relationship summing greater or less than one, wherein said second procedure multiplies data of said first image pixel stream with data of said second image pixel stream.

2. A logic circuit for manipulating image pixel streams to produce an output pixel image stream as described in claim 1 wherein said means for combining generates an output red color value, R, for a given pixel if said first alpha value and said second alpha value sum less than one according to said first procedure, wherein said first procedure is:

$$R = R1 + R2,$$

and wherein R1 is a red color value for said pixel in said first image pixel stream and R2 is a red color value for said given pixel in said second image pixel stream.

3. A logic circuit for manipulating image pixel streams to produce an output pixel image stream as described in claim 2 wherein said means for combining generates said output red color value, R, for said given pixel if said first alpha value and said second alpha value sum greater than one according to said second procedure, wherein said second procedure is:

$$R = R1 + (1 - a1)R2,$$

and wherein R1 is a red color value for said pixel in said first image pixel stream, R2 is a red color value for said given pixel in said second image pixel stream, and a1 is said first alpha value.

4. A logic circuit for manipulating image pixel streams to produce an output pixel image stream as described in claim 1 wherein said means for combining generates an output red color value, R, for a given pixel if said first alpha value and said second alpha value sum less than one according to said first procedure, wherein said first procedure is:

$$R = a1\,R1 + a2R2,$$

and wherein R1 is a red color value for said pixel in said first image pixel stream, R2 is a red color value for said given pixel in said second image pixel stream, a1 is said first alpha value, and a2 is said second alpha value.

5. A logic circuit for manipulating image pixel streams to produce an output pixel image stream as described in claim 4 wherein said means for combining generates an output red color value, R, for said given pixel if said first alpha value and said second alpha value sum greater than one according to said second procedure, wherein said second procedure is:

$$R = a1R1 + (1 - a1)R2,$$

and wherein R1 is a red color value for said pixel in said first image pixel stream, R2 is a red color value for said given pixel in said second image pixel stream, and a1 is said first alpha value.

6. A logic circuit for manipulating image pixel streams to produce an output image pixel stream said image pixel streams composed of individual pixels having an alpha value and a plurality of discrete color values said individual pixels of an image pixel stream having a common address, said logic circuit comprising:

receiving means for receiving a first image pixel stream representative of a first display image and a second image pixel stream representative of a second display image;

mode means for selecting a particular mode for combining a said first and second image pixel streams; and manipulation means for generating said output image pixel stream based on said first and second image pixel streams and in response to said particular mode selected by said mode means said manipulation means comprising first output color generation means for generating an output color value based on a plurality of functions of color values of said first and second image pixel streams, wherein an arithmetic multiplication function is included in said plurality of functions, wherein said manipulation means further comprises:

second output color generation means for generating an output color value based on a function of color values of said first and second image pixel streams and further based on alpha values of said first and second image pixel streams, such that said alpha values summing to one or greater; and means for selecting said second image pixel stream over said first image pixel stream when color values of said first image pixel stream exceed a predetermined value.

7. A logic circuit for manipulating image pixel streams to produce an output pixel image stream, said image pixel streams composed of individual pixels having an alpha value and a plurality of discrete color values, said individual pixels of an image pixel stream having a common address, said logic circuit comprising:

receiving means for receiving a first image pixel stream representative of a first display image and a second image pixel stream representative of a second display image:

mode means for selecting a particular mode for combining said first and second image pixel streams; and manipulation means for generating said output image pixel stream based on said first and second image pixel streams and in response to said particular mode selected by said mode means, said manipulation means comprising first output color generation means for generating an output color value based on a plurality of functions of color values of said first and second image pixel streams, wherein an arithmetic multiplication function is included in said plurality of functions, wherein said manipulation means further comprises:
- means for multiplying color values of said first image pixel stream by a alpha value or for multiplying said second image pixel stream by said alpha value: and
- means for selecting said second image pixel stream over said first image pixel stream when color values of said first image pixel stream exceed a predetermined value.

8. In circuitry which transfers data in streams in which a plurality of individual discrete pixels of data are all addressed to the same address, an apparatus for manipulating the data appearing in streams, wherein the streams are composed of pixels individually containing an alpha field and discrete color fields, said apparatus comprising:
- a circuit, that is responsive to each pixel of the data transferred from each stream, said circuit generating an output pixel color value by arithmetically multiplying discrete color values of individual input pixels from each stream, said circuit coupled to receive each stream and wherein said circuit further comprises:
  - (a) a first circuit operating in a first mode for outputting a color value, said first circuit including a circuit for multiplying a color value by an alpha field;
  - (b) a second circuit operating in a second mode for outputting a pixel color value generated independently of and irrespective of said alpha field.

9. An apparatus for manipulating the data appearing in streams as claimed in claim 8 further comprising a third circuit generating an alpha value for said output pixel by manipulating data relating to the alpha field of individual pixels from each of the streams.

10. An apparatus for manipulating the data appearing in streams as claimed in claim 9 in which the circuit generating an output pixel color value comprises means for combining two streams of data.

11. An apparatus for manipulating the data appearing in streams as claimed in claim 10 in which the circuit generating an output pixel color value further includes means for selecting the relative weights to be given to data from each stream in a combined stream.

12. An apparatus for manipulating the data appearing in streams as claimed in claim 10 in which the means for combining two streams of data includes means for selecting one stream to the exclusion of the other when data of a particular level exists for the one stream.

13. An apparatus for manipulating the data appearing in streams as claimed in claim 10 in which the means for combining two streams of data further includes means for selecting data from one stream to the exclusion of data of the other when data exists for the one stream.

14. An apparatus for manipulating the data appearing in streams as claimed in claim 10 in which the means for combining two streams of data includes means for indicating that data is to be clipped.

15. An apparatus for manipulating the data appearing in streams as claimed in claim 10 in which the means for combining two streams of data includes means for multiplying the data of one stream by a value.

16. An apparatus for manipulating the data appearing in streams as claimed in claim 15 in which the means for combining two streams of data further includes means for selecting the relative weights to be given to data from each stream in a combined stream.

17. An apparatus for manipulating the data appearing in streams as claimed in claim 15 in which the means for combining two streams of data includes means for selecting one stream to the exclusion of the other when data of a particular level exists for the one stream.

18. An apparatus for manipulating the data appearing in streams as claimed in claim 15 in which the means for combining two streams of data further includes means for selecting data from one stream to the exclusion of data of the other when data exists for the one stream.

19. An apparatus for manipulating the data appearing in streams as claimed in claim 15 in which the means for combining two streams of data further includes means for indicating that data is to be clipped.

20. An apparatus for manipulating the data appearing in streams as claimed in claim 8 in which the circuit generating an output pixel color value includes means for multiplying a color value of an input pixel by an alpha value.

* * * * *